March 9, 1948.    J. O. BERNDTSON    2,437,314
TRANSMISSION MECHANISM
Filed Nov. 27, 1943    8 Sheets-Sheet 1

Inventor
John O. Berndtson
By Rockwell & Bartholow
Attorneys

March 9, 1948. J. O. BERNDTSON 2,437,314
TRANSMISSION MECHANISM
Filed Nov. 27, 1943 8 Sheets—Sheet 2

Inventor
John O. Berndtson
By Rockwell & Bartholow
Attorneys

March 9, 1948.    J. O. BERNDTSON    2,437,314
TRANSMISSION MECHANISM
Filed Nov. 27, 1943    8 Sheets-Sheet 3

Inventor
John O. Berndtson
By Rockwell & Bartholow
Attorneys

March 9, 1948. J. O. BERNDTSON 2,437,314
TRANSMISSION MECHANISM
Filed Nov. 27, 1943 8 Sheets-Sheet 4

Fig. 4.

Inventor
John O. Berndtson
by Rockwell & Berndtson
Attorneys

March 9, 1948.  J. O. BERNDTSON  2,437,314
TRANSMISSION MECHANISM
Filed Nov. 27, 1943  8 Sheets-Sheet 5

Inventor
John O. Berndtson
By Rockwell & Bartholow
Attorneys

March 9, 1948. J. O. BERNDTSON 2,437,314
TRANSMISSION MECHANISM
Filed Nov. 27, 1943 8 Sheets-Sheet 6
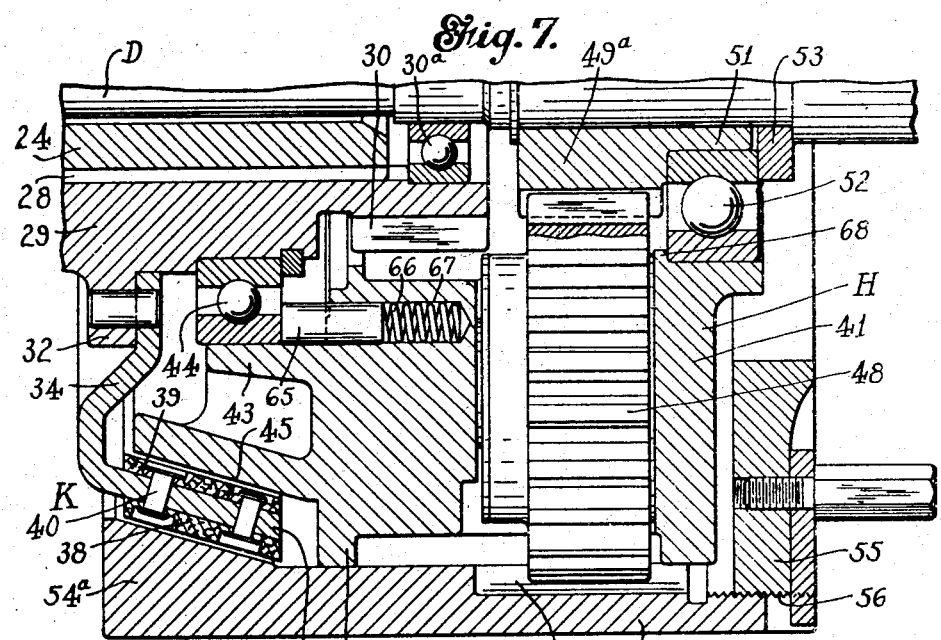
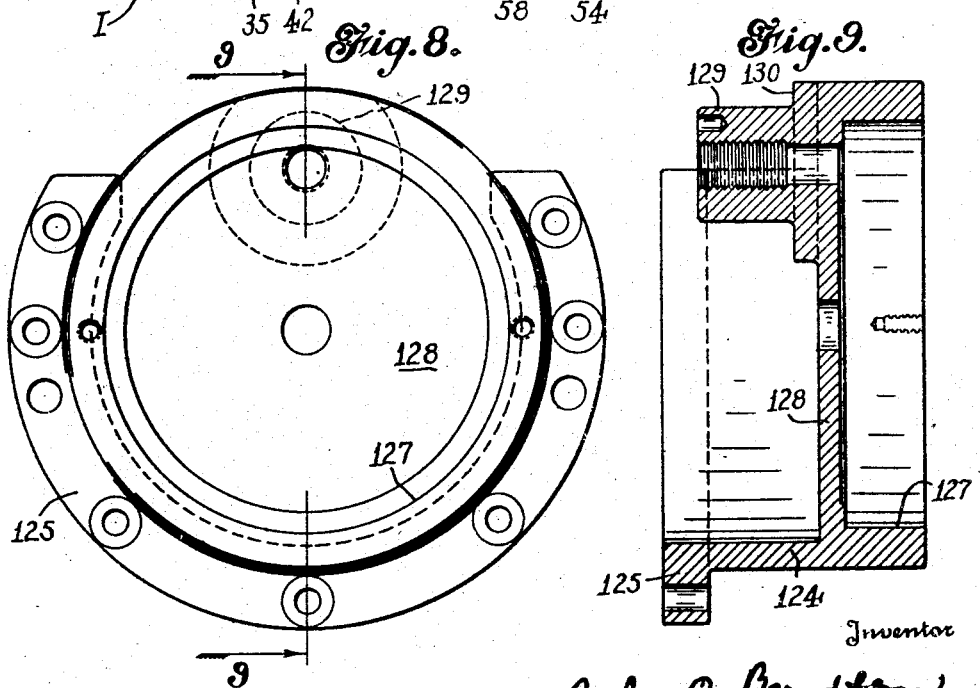
Inventor
John O. Berndtson
By Rourke & Bartholow
Attorneys

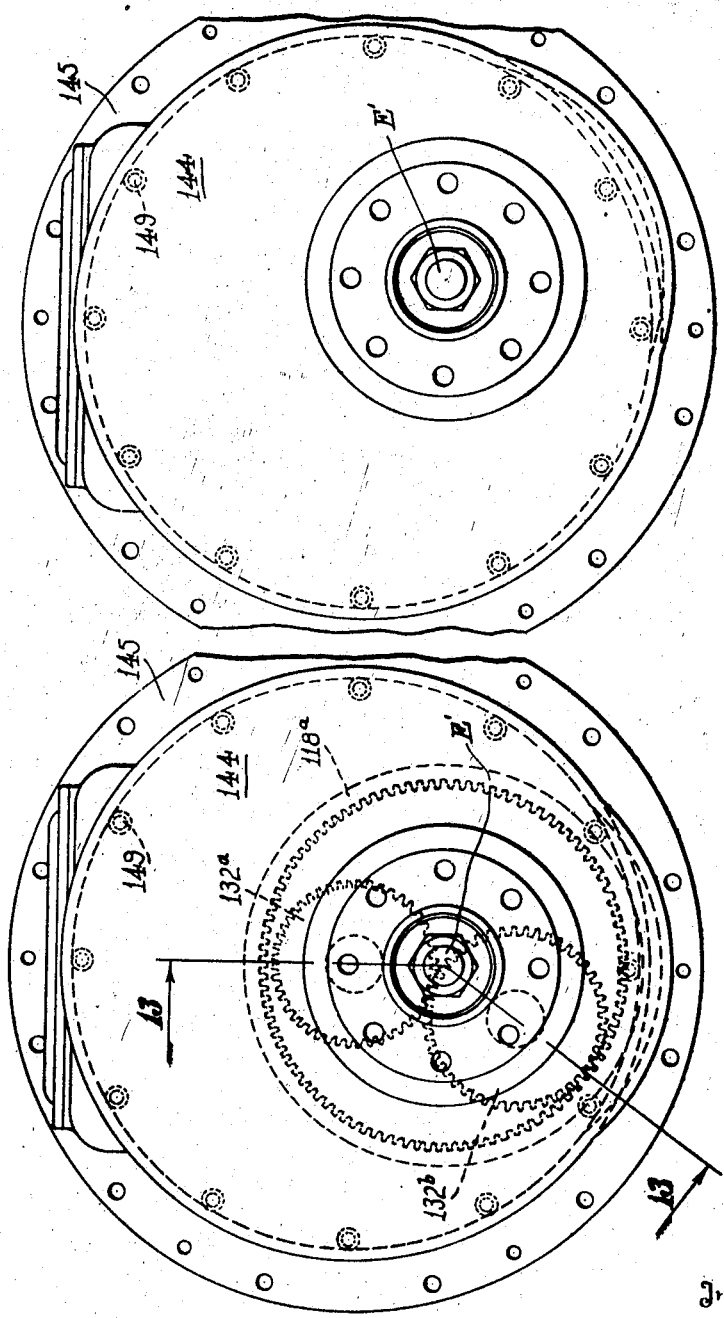

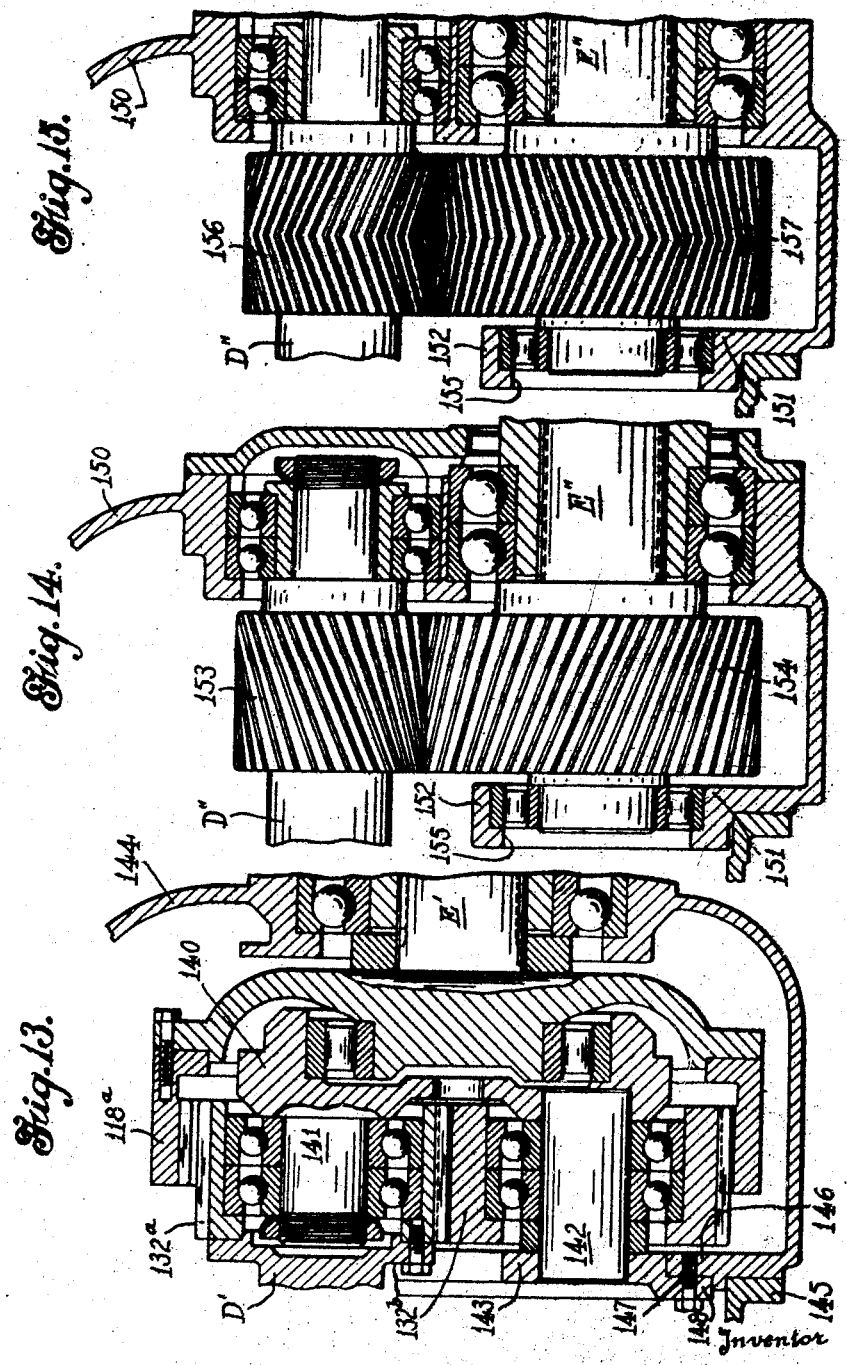

Patented Mar. 9, 1948

2,437,314

UNITED STATES PATENT OFFICE 2,437,314

TRANSMISSION MECHANISM

John O. Berndtson, Short Beach, Conn., assignor to The Snow-Nabstedt Gear Corporation, New Haven, Conn., a corporation of Connecticut Application November 27, 1943, Serial No. 511,955

11 Claims. (Cl. 74—298)

This invention relates to improvements in transmission mechanism, and is particularly directed to improvements in transmission mechanism for marine use although not limited to that application.

One of the objects is to provide a simple, compact, and sturdy transmission mechanism adapted to connect a marine engine to a propeller shaft in such a manner that forward and reverse drive of the propeller shaft can be readily obtained as desired.

Another object of the invention is to provide improved means for connecting a driving member, such as a member connected to and driven from a marine engine, to a driven member which may be appropriately connected to a propeller shaft or other power takeoff.

A further object is to provide improved means including a pinion cage and a brake-equipped housing associated with the cage, for connecting an engine-driven member to a driven shaft.

Yet another object of the invention is to provide certain improvements in a transmission mechanism in which there is a reduction of speed between the engine-driven member and the power takeoff, as will be hereinafter described.

To these and other ends the invention consists in the novel features and combination of parts to be hereinafter described and finally pointed out in the claims.

In the accompanying drawings:

Fig. 4 is a section on line 4—4 of Fig. 1;

Figure 6:
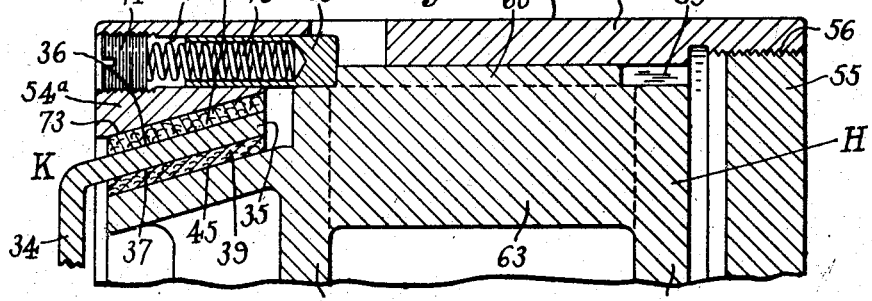
Figure 2A:
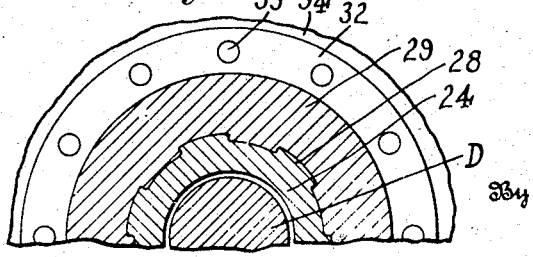
Fig. 2A is a detail section on line 2A—2A of Fig. 2.
Figure 3:
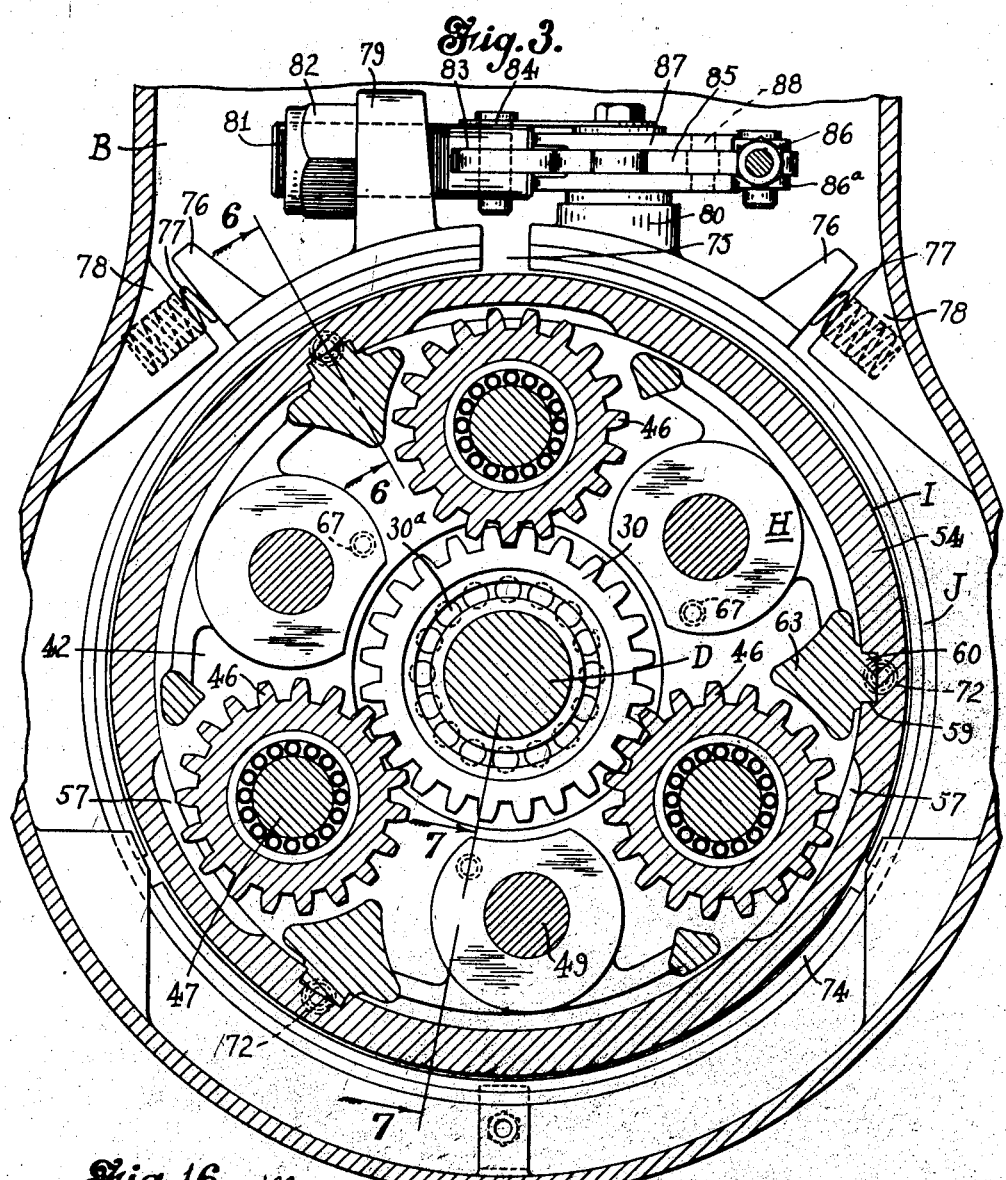
Fig. 3 is a section on line 3—3 of Fig. 1.
Figure 16:
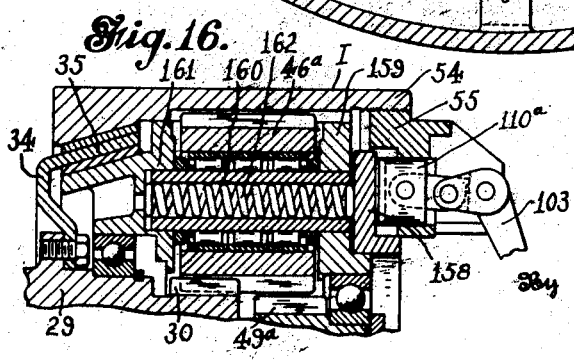
Figure 5:
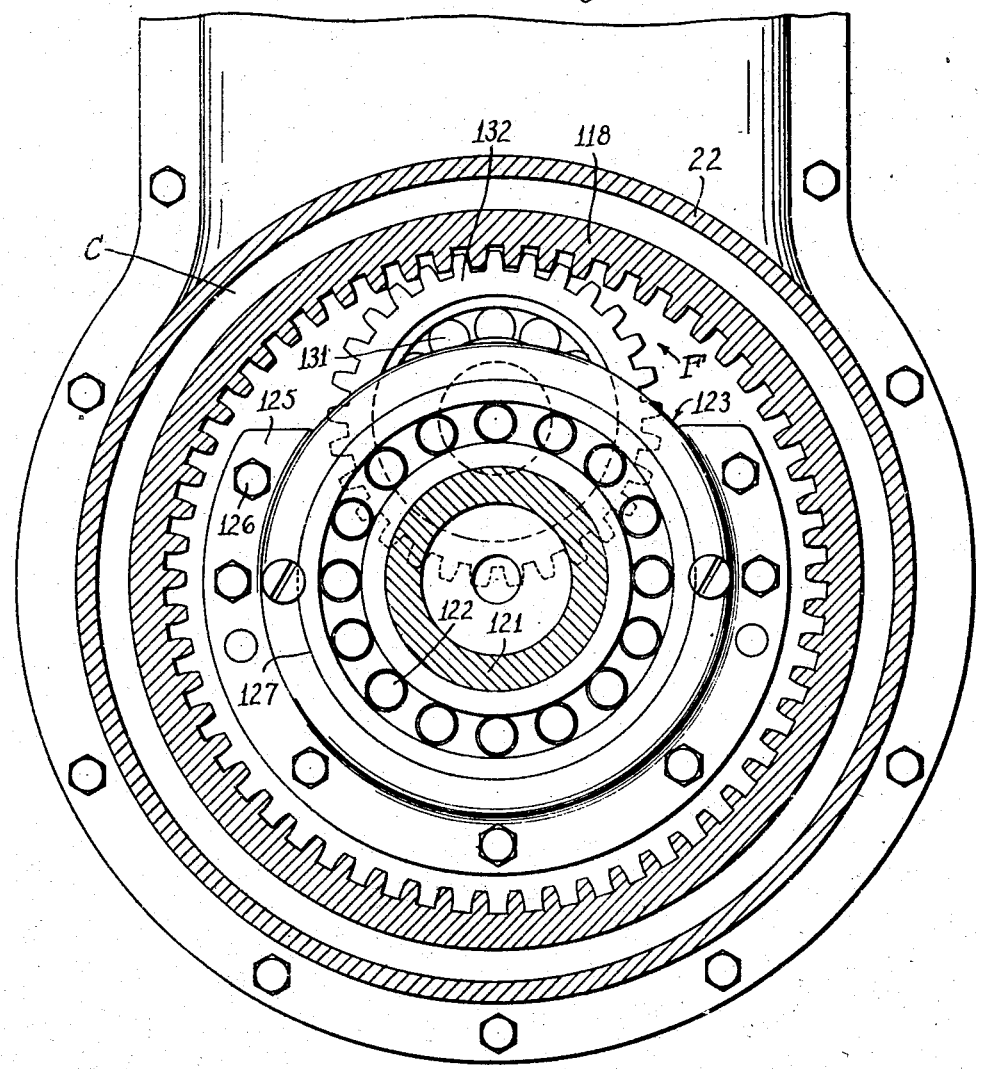
Fig. 5 is a section on line 5—5 of Fig. 1.
Figure 10:
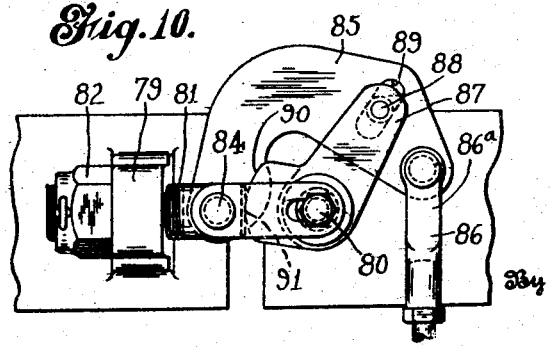

Figs. 6 and 7 are enlarged detail views, the same being partial sections taken on lines 6—6 and 7—7, respectively, of Fig. 3;

Fig. 8 is a rear view of the supporting member used in connection with the reduction gearing;

Fig. 9 is a section on line 9—9 of Fig. 8;

Fig. 10 is a plan view of the mechanism for tightening and releasing the brake band;

Fig. 11 is an external view of a transmission of somewhat modified form, looking from the rear end;

Fig. 12 is a view similar to Fig. 11, showing another possible location of the propeller shaft;

Fig. 13 is a section on line 13—13 of Fig. 11;

Figs. 14 and 15 are views somewhat similar to Fig. 13, showing other modifications; and Fig. 16 is a detail sectional view showing a modification of the pinion cage structure.

In the marine transmission selected for illustration, the mechanism comprises a housing divided into a forward or main portion of a predetermined height and a rear portion of somewhat less height, the main portion accommodating a main shaft adapted to be driven from a marine engine and the rear portion of the housing accommodating an offset stub shaft for connection with a propeller shaft or other takeoff, there also being in the rear portion of the housing a reduction gearing which interconnects the main shaft with the stub shaft. In the main portion of the housing there is provided, among other things, a pinion cage surrounding the main shaft and having associated therewith a separate external member in the nature of a drum adapted to be braked by an encircling brake band. There is also associated with the pinion cage, and its enclosing or associated member, certain gearing adapted to produce forward and reverse drive of the main shaft, as may be desired, and, for providing forward drive, a friction clutch having one member associated with the driving member of the organization is employed.

In the drawings, the main housing is shown at A, the same having a forward or main portion B and a rear portion C. The main shaft is shown at D and the stub shaft at E. The reduction gearing in portion C is indicated at F. Associated with the main shaft D is a concentric engine-driven member G. The pinion cage is shown at H, the pinion cage drum or shell at I, and the encircling brake band at J. The friction clutch, having one member driven from the engine-driven member G, is indicated generally at K.

Referring now to the details, it will be noted that the main housing has a forward wall 20 in which the main shaft D is mounted and, at its rear end, the main shaft extends into proximity to and is supported from a transverse wall or partition 21 which, to an extent, divides the main housing into forward and rear chambers or compartments, the rear compartment C being provided within a housing section 22 secured in position against the partition 21 and for the most part of less height than the main portion of the housing.

The main shaft D is shown as extending somewhat forwardly from the forward housing wall 20, and its forward extremity is received in an anti-friction bearing 23, which, in turn, is received within a cupped portion at the forward end of a sleeve member 24. The sleeve member 24 surrounds the shaft D loosely and is of appreciable length, and at the forward end thereof, at a point externally of the housing, this sleeve member has provisions of a suitable kind whereby it is rotated from the engine. In the particular case illustrated, the sleeve 24 is equipped with a coupling flange 25 for connection to a suitable coupling (not shown) on the engine shaft, but this is merely by way of example. Between the coupling flange 25 and the wall 20, a ring member 26 is fastened to the housing, in an appropriate manner, this ring member being equipped with a lubricant seal 27.

Embracing the sleeve 24 and splined thereto by means of splines 28 is a sleeve 29 carrying at its inner end a gear 30 which may be integral therewith. The gear portion of sleeve 29 projects rearwardly beyond sleeve 24 and helps to support shaft D by an anti-friction bearing 30ᵃ. At the other end of the sleeve 29, the same is recessed externally to accommodate an anti-friction bearing 31 which is interposed between sleeve 29 and a portion of the front wall of the housing, and which permits sleeves 24 and 29 to have free rotation as a unit in the housing.

The sleeve 29 carries a member of the clutch K previously mentioned, and for this purpose sleeve 29 is provided with a flange 32 against which is clamped, by means of screws 33, a web 34 having a bent peripheral portion 35 carrying opposite friction surfaces 36 and 37. These surfaces may be provided by applying to opposite faces of a slanting portion of the web 34 friction linings 38 and 39 of suitable material which are held in place by rivet members 40 extending through the friction linings and the web. In this manner there is provided, as a part of clutch K, a conical friction member having internal and external friction surfaces, and it may be noted that the inner friction surface is adapted to coact with a part carried by pinion cage H, while the outer friction surface is adapted to cooperate with a part carried by the drum or shell I, as will be described later on.

The pinion cage H loosely surrounds shaft D and has a rear plate 41 and a front plate 42. The front plate 42, by means of a forward extension 43 thereof, rotates on an anti-friction bearing 44 which is interposed between it and sleeve member 29. On a portion of part 43 which is radially outermost, a friction surface 45 is provided which is of conical shape and which is adapted to be contacted by the inner friction surface of the duplex clutch member previously described, for the purpose of clutching sleeve member 29 to the pinion cage. Between plates 41 and 42 of the pinion cage are extended fixed bearing pins serving for the mounting of pinions in the pinion cage, there being long spur pinions 46 mounted by means of anti-friction bearings on pins 47, and short spur pinions 48 mounted by means of anti-friction bearings on the pins 49. The long pinions 46 are in engagement with the gear 30 previously mentioned, and each of the long pinions is also meshed with an associated short pinion 48, and all of the pinions 48 are in mesh with a gear 49ᵃ keyed to the shaft D by a key 50.

The gear 49ᵃ has a projecting sleeve portion 51 in the plane of the plate 41, and between the sleeve 51 and the plate 41 an anti-friction bearing 52 is arranged so that the cage at its rear portion is effectively supported for rotation about the shaft. A ring 53, provided on the shaft, holds the anti-friction bearing 52 in place.

The drum or shell I, enclosing the pinion cage, comprises a hollow cylindrical member 54 of somewhat greater length than the pinion cage, provided at the forward end with a portion 54ᵃ adapted to coact with the outer friction surface of the duplex clutch member previously described. At its rear end, the member 54 is continued beyond the pinion cage and has attached to it a wall 55 of annular shape which may be secured to it by means of inter-engaging screw threads 56. The member 54 is provided, on its inner surface, with cutaway portions 57 which clear the teeth of the pinions 46, and at other points in its circumference member 54 is provided with cutaway portions 58 which clear the teeth of the pinions 48. At certain points in its inner circumference, the member 54 is provided with grooves or keyways 59 which are engaged by guide ribs 60 carried by the pinion cage, the ribs 60 being formed on spacing members 63 provided within the cage, the spacing members 63 preferably integrally interconnecting the front and rear plates of the cage. By this construction, the member or shell I and the pinion cage H are interconnected for concurrent rotation at all times, while, nevertheless, relative axial sliding movement between the two is permitted.

As shown, a number of spring devices act upon the pinion cage, one of these devices being shown in Fig. 7 and including a cylindrical member 65 abutting against the anti-friction bearing 44 at one side of the member and against a spring 66 at the other side of the member, the spring 66 being disposed in a socket 67 formed within the pinion cage. The tendency of this spring is to move the cage toward the right (Fig. 7) and hold a small stop shoulder 68 thereon against the anti-friction bearing 52. Also, a number of spring devices are used tending to urge the member I in a leftward direction with respect to the cage, one of these spring devices being shown in Fig. 6, and the same including a recessed plug 69, a helical spring 70, and a screw-threaded adjusting plug 71. The plug 69 bears against one end of one of the ribs 60. The plug 69 is mounted in a socket 72 formed in the front end portion of member 54, and the spring 70 is enclosed in the part 69 and has an outer end portion engaged by the threaded plug 71 which enables the spring pressure to be adjusted. At its forward end, the member 54 is provided on portion 54ᵃ with an inner conical surface 73 sloping in a rearward and upward direction and adapted to make contact with the outer friction lining which forms a part of the clutch K.

The outer surface of the shell I is smooth and is adapted to be contacted by a lining 74 of the brake band J previously mentioned. This brake band is mounted in the manner indicated in Fig. 3, the same comprising a band having a gap or interruption 75 at the upper part, the terminal portions of the band being provided with lugs 76 acted upon by helical springs 77 socketed in lugs 78 formed on the wall of the housing.

The mechanism for tightening the brake band includes a lug 79 extending upwardly from one of the band ends and a post 80 extending upwardly from the other band end. A threaded shank 81 passes with clearance through the lug 79 and has on the outer end thereof an adjusting nut 82. At the right of the lug 79 (Fig. 3), the shank 81 has a kerf 83 in which is pivoted by a pin 84 (Fig. 10) a lever 85 adapted to be pulled by an operating link 86 hereinafter more particularly described. Above, and below, respectively, the lever 85 are lever members forming part of a duplex elbow lever 87 which has a pin 88 engaging a slot 89 in lever 85. The lever 87 also has cam surfaces 90 adapted to cooperate with corresponding surfaces 91 on the threaded shank 81. Assuming the parts to be in position shown in Fig. 10, it will be evident that a pull on link 86 will rock lever 85 on its pivot and cause a shifting of post 80 to the left, thereby tightening the brake band.

The link 85 preferably comprises a clevis 86ª connected by a threaded shank 92 to a clevis 93 pivoted at 94 on the upper end of a lever 95. This lever 95 is pivoted at 95ª and has forked-shaped end portions 96 at opposite sides of the main shaft adapted to engage pins 97 carried on the outer race 98 of an anti-friction bearing 99 fitted within a seat 100 in an axially moving sleeve 101 surrounding the main shaft. This sleeve 101 is operated to cause relative axial movement between the pinion cage and its surrounding shell or housing, and, in the particular form shown, the sleeve is provided with a number of socket portions 102 engaging shifting levers 103 provided on the pinion cage housing. These levers 103 are formed as elbows pivoted intermediate of their ends by means of pins 104 mounted in lugs 105 extending rearwardly from the pinion cage housing plate 55. The levers 103 have relatively long arms, the inner ends of which are engaged in the socket portions 102. The levers 103 have short arms 106 projecting rigidly therefrom and pivoted by pins 107 to links 108, the latter links being pivoted by means of pins 109 to plungers 110 adapted to slide in a forward and rearward direction in guide openings or apertures 111 provided in the plate 55.

As the elbow levers 103 are shifted about their pivots 104, they are adapted to shift the links 108 and the plungers 110 in a forward and rearward direction, and the plungers 110 are adapted to abut appropriate surfaces on the rear end of the pinion cage for the purpose of controlling the axial movement of the cage relatively to its enclosing shell. In the neutral position of the transmission, shown in Fig. 2, the cage and its enclosing shell are in such positions as to disengage the axially fixed duplex member of the clutch K, but in forward drive position, shown in full lines in Fig. 1, the elbow levers 103 are in a different position, and it will be noted that in this position the forwardly extending portions of the elbow levers, together with the links 108, acting as toggles, lock the plungers 110 in the position shown in Fig. 1, the toggles previously mentioned being, at this time, in an overcenter or locking position. In this position, the pinion cage is thrust forwardly as far as possible from the position of Fig. 2, and the enclosing shell is thrust rearwardly as far as possible from that position, the result being to clamp the duplex friction member tightly between the opposing cone surfaces carried by the cage and shell so as to clamp the pinion-carrying structure firmly to the sleeve 29. This action is, of course, brought about by shifting of the lever 95 (by means of externally accessible rock shaft 95ª) from the position of Fig. 2. When the friction clutch is in the engaged position shown in Fig. 1, the springs 66 and 70 are compressed and, upon the return of the operating lever 95 to the original position (Fig. 2), these springs, in expanding, will aid in quickly restoring the pinion cage and its enclosing shell to their original relative axial positions, thereby promptly freeing the friction clutch.

Now referring more particularly to the reduction gearing with which the transmission is provided, and its relation to the shafts D and E, it my be noted that the shaft E is shown as provided with an embracing coupling member 112 having a flange 113 for connection to a propeller shaft or the like, the coupling member 112 having a sleeve portion 114 mounted by means of an anti-friction bearing 115 in the rear end portion of the housing. Around the shaft E, forwardly of the bearing 115, is a thrust collar 116, and immediately in front of this collar and bearing thereagainst is a flange portion 117 formed integrally with the shaft and acting as a carrier for an internal gear 118 which is a part of the reduction gearing F. In the example shown, the internal gear 118 (which is concentric with shaft E) has an axial extension whereby it is secured by screws 119 and pins 120 to the periphery of the flange 117. In front of the flange 117, a short integral portion 121 of somewhat greater diameter than the main portion of shaft E is formed integrally with that shaft, so as to create a short forwardly disposed stub thereon. Around this stub is placed an anti-friction bearing 122, shown as a roller bearing, and this bearing is placed between a portion of flange 117 and a supporting member 123 which is attached to the housing and located rearwardly of the partition 21. The supporting member 123 is shown in detail in Figs. 8 and 9, and it will be observed that it has a cylindrical body 124 carrying at the forward end a flange 125 by means of which said member is attached to the partition 21 by means of screws 126. At its rear end, the member 123 is provided with a cylindrical socket 127 adapted to receive the anti-friction bearing 122. The forward wall of the socket 127 is formed by a partition 128 and at its upper forward portion the partition 128 is provided with an integral boss 129. Surrounding the boss 129, and abutting a shoulder 130 provided thereon, is an anti-friction bearing 131. The inner race of this bearing fits against the boss 129 and its outer race is fitted within a spur pinion 132 supported within the upper part of the internal gear 118 and having its teeth meshing with those of said internal gear. The pinion 132 is a drive pinion and it is suitably connected to the rear end portion of shaft D. In the particular form shown, the rear extremity of shaft D is provided with a lateral flange 133 and the pinion 132 is secured to this flange by means of screws 134 and pins 135. The anti-friction bearing 131 is held in place by means of a washer 136 engaging its inner race at the forward end of the latter, said washer being held in place by a bolt 137 having its head disposed in a cutaway portion of the flange 133.

Figure 1:
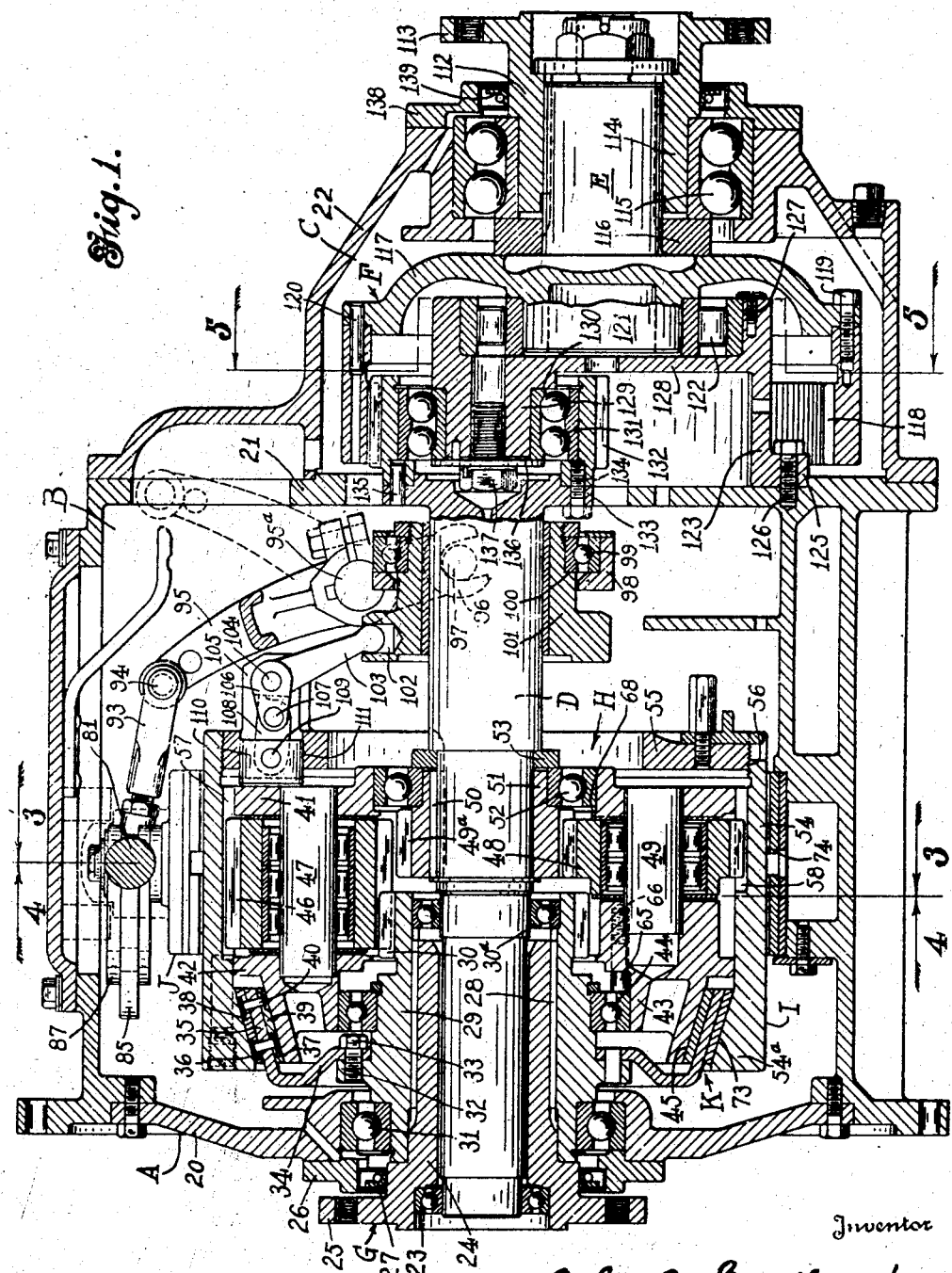
Fig. 1 is a vertical longitudinal section of a transmission mechanism for marine use embodying my improvements, the same being shown in position for forward drive.

In Fig. 1, the transmission mechanism is shown in position for forward drive and it is believed from what has been said previously that the operation of the parts in forward drive will be clear. In this position, the drive imparted from the engine through the drive sleeve 24 is carried through the splines and the sleeve 29 and the friction clutch K to the structure carrying the pinions 45, 48, which structure is thereby rotated with its pinions in locked engagement on the one hand with the gear 30 and, on the other hand, with the gear 49ª. The latter gear being fixed to the shaft D, that shaft is rotated by rotation of gear 49ª and, through the reduction gearing comprising pinion 132 and the internal gear 118, the drive shaft E is rotated in the same direction as the shaft D.

Figure 2:
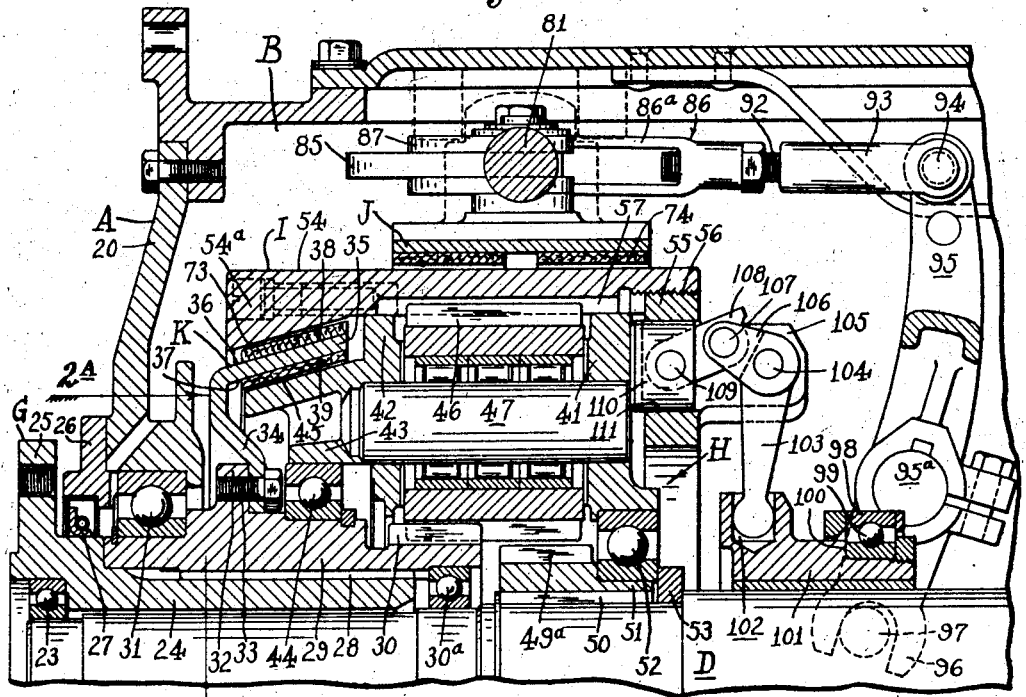
Fig. 2 is a sectional view of certain parts shown in Fig. 1, on a larger scale, illustrating the position of the parts when the transmission is in neutral.

Upon movement of the operating lever 95 to the position shown in Fig. 2, the actions previously described will take place, the clutch K being freed and the pinion cage and its enclosing shell taking the positions shown in Fig. 2. There is then no drive of the driven shaft E inasmuch as shaft D and its gear 49a receive no driving impulse, the pinion cage and its shell being free of the duplex friction member carried by sleeve 29, which member simply rotates in a clearance space between the shell and the cage. Should the lever 95, however, be moved back toward the position of Fig. 1, the pinion cage will be thrust forwardly and the shell drawn rearwardly so as to quickly engage the clutch K and start the forward drive. It may be noted, however, in connection with the structure of clutch K that the inner and outer friction surfaces carried by the web member are not engaged fully with their corresponding friction surfaces at the same moment, there being a tendency to engage one pair of surfaces somewhat ahead of the other pair, this being an inherent effect of the structure which I have devised, and thus there is no tendency of the clutch to engage suddenly or grab.

When reversal of the propeller shaft is desired, the mechanism is moved from the neutral position of Fig. 2 by shifting the upper part of lever 95 to the right with respect to that figure so that the lever assumes the position shown in the dotted lines of Fig. 1. The effect of this is to engage the brake band with the shell of the pinion cage so as to lock the shell against angular movement. As a result, the pinion cage which is locked to the shell is locked against angular movement and the pinions are held with their axes in fixed locations. As a result, the rotation of sleeve 29 and gear 30 causes the long pinions 46 to be rotated on their axes in a reverse direction, and therefore the short pinions are driven reversely as compared to the long pinions, causing the gear 49a and shaft D to be rotated in a direction reversely with reference to the Fig. 1 direction.

It will be noted that a ring member 138 is applied to the rear end of the housing, said member carrying a lubricant seal 139 in engagement with the external surface of the coupling member 112. These provisions against the escape of lubricating oil from the rear end of the casing are similar to those used at the front end of the casing. It will be noted that the casing or housing is intended to be supplied with a quantity of lubricating oil which, by the rotation of the parts, is thrown or otherwise supplied to the bearings requiring lubrication.

In Figs. 11, 12, and 13, there is shown a modified form of transmission which differs from that previously described in respect to the reduction gearing between the main shaft and the driven shaft. A situation may be presented where it is desired to provide transmissions on a boat having two oppositely driven propellers, and to meet such a condition it is desirable to provide for the drive of the driven shaft in either of two directions with respect to the main shaft, as may be required. Such a construction is shown in these views, which show a transmission in which it is possible to insert an extra pinion in the drive when that is desired.

In these views, 132a is a pinion fixed to the drive shaft D' but out of mesh with the internal gear 118a. The drive is from pinion 132a to a second pinion 132b and from 132b to the internal gear 118a. This will, of course, produce a drive which is reversed with respect to that shown in Fig. 1. Where a drive in the same direction as in Fig. 1 is desired, the pinion 132b is removed and a pinion of the proper size to engage the internal gear substituted for 132a.

In this form of Figs. 11, 12, and 13, also, there is a change from the form of Fig. 1 in respect to the supporting member for the pinion or pinions that may be provided in connection with the internal gear. Here, the supporting member is shown at 140 and the same has an integral boss 141 generally similar to boss 129 but differing in detail. Where a second pinion is required in the drive, a bearing pin 142 for said pinion is fitted into position between the body of the supporting member 140 and a cheek 143 formed as a part thereof.

Another difference over the form first described arises from the fact that, while the supporting member for the inner ends of the two shafts is attached as before to a transverse partition member in the main housing, this partition member is provided as a part of the rear housing section 144 (the section supporting the outer end of the driven shaft E') rather than upon the section 145 in which the shaft D' is disposed. It will be noted that, in this particular form, the housing section 144, adjacent its forward end portion, has an integral inwardly extending member 146 serving as a partition, and it will be observed that the supporting member 140 is attached to the forward face of member 146 by screws 147 passing through the flange 148 provided upon member 140 at its forward peripheral portion.

A further difference of the form of Figs. 11, 12, and 13, over the form of Fig. 1, arises from the fact that in the former the rear housing section 144 is adjustable angularly on the forward housing section 145 upon an axis coinciding with the axis of the drive shaft D'. Thus, the rear housing section can be adjusted from the position shown in Fig. 11 to that shown in Fig. 12, for example, in order to permit the propeller shaft or other takeoff shaft to be disposed in another location relatively to the drive shaft, as may be desired. This shift may be made without making any change in the reduction gearing interconnecting the two shafts, inasmuch as all the shifting parts turn on the axis of the drive shaft while the gears remain in mesh. All that is necessary is the removal of the screws or like members 149 interconnecting the two housing sections, and their replacement, after section 144 has been shifted angularly to a certain extent. In the adjustment shown in Figs. 11 and 13, the lower shaft is in the same vertical plane as the upper shaft but it may be desirable for one reason or another to place the lower shaft at one side or the other of this plane in installing the mechanism in a boat, and this may be readily done where the features described above are provided.

In the modified form shown in Fig. 14, the angular adjustability of the rear housing section and some of the gearing about the axis of the drive shaft is retained. In this instance the drive shaft D" has its rear end journalled in the rear housing section 150, as shown. This housing section 150 has journalled in it also the outer end of the lower shaft E", and the partition 151 provided in section 150 furnishes a cheek 152 in which the inner end of shaft E" is journalled. In this case, the shaft D" carries a helical gear 153 meshing with a helical gear 154 on the shaft E". In addition to the opening 155, provided in cheek 152 for mounting shaft E", one or more additional angularly offset openings, similar to opening 155, may be provided in the cheek and other provisions furnished whereby an additional pinion can be introduced in the drive of shaft E" for purposes of providing drive thereof in the reverse direction.

Fig. 15 illustrates another modification which is similar to that shown in Fig. 14 except that the drive pinion 156 and the driven pinion 157 are of the double helical or herringbone type.

In Fig. 16, I have shown a modified form of the pinion-carrying structure which is mounted around the main shaft or drive shaft. Here, instead of having the plungers (110) acting directly against the rear plate of the pinion cage for shifting the cage axially, I provide plungers 110ª which act upon an annular plate 158 which is axially shiftable relatively to a rear plate 159 of the pinion cage. The long pinions 46ª and also the short pinions are mounted upon tubular elements 160 extending between the plates 159, 161, of the pinion cage, and within these tubular elements are helical springs 162. Plate 158 engages one end of the helical spring, and the other end of the spring is abutted against the front plate 161. When the plungers are thrust forwardly, annular plate 158 is advanced by them and the springs 162 are compressed to a certain extent before these springs are effective to move the front plate of the cage, which front plate carries the friction surface that engages the inner friction surface on the cone ring. In this manner, the inner element of the friction clutch is yieldingly pressed into action, and the action of the springs 162 is also transmitted to the outer friction element of the clutch by way of the plate 158, the plungers, and the plunger mountings, which mountings are fixedly carried by the outer member or drum. By this arrangement there is compensation for wear and possible unevenness in the coacting friction surfaces of the clutch mechanism.

The transmission mechanism shown in the drawings is, as previously appears, of the type where the main housing is closed and sealed at the forward end with provisions for coupling its main shaft to an external engine-driven shaft. When the transmission is to be attached directly to the engine (so that its main shaft is driven from the engine flywheel), instead of being mounted separately, certain minor alterations are made. In such case the forward wall of the housing acts as a baffle plate, the bearing 31, the plate 26, and the seal 27 being eliminated, and the forward wall may have a very small clearance about the hollow shaft or sleeve 29 so that the oil within the transmission will be prevented from mixing with that of the engine.

It will be seen from the foregoing that the present invention provides a simple, compact, and sturdy transmission of the type in which a main shaft connected by reduction gearing with a driven shaft is adapted to be driven in either direction as may be desired. The main drive shaft and the mechanism for driving it in either direction takes up little space lengthwise of the boat, which is a very desirable feature. The control mechanism is simple, and the various parts of the transmission are well housed and protected although the interior parts are readily accessible for repairs if and when repairs are necessary. The invention also enables the interior parts of the mechanism to be kept well lubricated while, nevertheless, the friction clutch means is very durable and continues to operate and to transmit power, effectively, over a long period.

Various changes in the arrangement and organization of parts and in the details of the structure can be made without departing from the principles of the invention or the scope of the claims.

What I claim is:

1. In a transmission mechanism, the combination of a driving sleeve gear, a driven sleeve gear, a brakeable pinion-carrying structure cooperating with said gears having two members which are axially shiftable relatively to each other, and a friction element rigidly fixed on and rotating with said first sleeve gear which is adapted to be clamped between substantially parallel opposing friction surfaces carried by the respective members of the pinion-carrying structure.

2. In a transmission mechanism, the combination of a driving sleeve gear, a driven sleeve gear, a brakeable pinion-carrying structure cooperating with said gears comprising parts which are relatively axially shiftable, inner and outer conical friction surfaces carried by said parts and facing each other, and a duplex conical friction element rigid with the sleeve of one of said gears and adapted to be engaged and clamped between said surfaces.

3. In a transmission mechanism, the combination of a driving sleeve gear, a driven sleeve gear, a brakeable pinion-carrying structure cooperating with said gears including an outer shell or drum having an inner friction surface and a pinion cage movable axially within said drum, means for shifting said pinion cage axially, a friction element carried by and rotating with said first sleeve gear and having an inner conical friction surface, and a friction surface on said pinion cage which when said cage is shifted axially presses against said conical friction surface and forces said element into frictional engagement with the friction surface of said drum.

4. In a transmission mechanism, the combination of a driving sleeve gear, a driven sleeve gear, a pinion-carrying structure cooperating with said gears including an outer shell or drum and an inner pinion cage shiftable axially with respect thereto, an outwardly extending web rigid with the sleeve of the drive gear having inner and outer cone friction surfaces, means on the pinion cage adapted to engage the inner friction surface, and means within the drum adapted to engage the outer friction surface.

5. In a transmission mechanism, the combination of a driving sleeve gear, a driven sleeve gear, a brakeable pinion-carrying structure cooperating with said gears comprising a pinion cage carrying a plurality of eccentrically mounted pinions and an enclosing shell or drum for the cage which is axially shiftable relatively to the cage, said cage having tubular pins or elements mounting said pinions, and means of frictional connection between one of said sleeve gears and said pinion-carrying structure comprising interengaging friction elements and loading springs acting on said elements extending through said tubular pins.

6. In a transmission mechanism, the combination of a driving sleeve gear, a driven sleeve gear, a brakeable pinion-carrying structure cooperating with said gears comprising a pinion cage having a plurality of tubular pinion supporting pins and an enclosing shell or drum for the cage, which is shiftable axially relatively to the cage, and means of frictional connection between one of said sleeve gears and said pinion-carrying structure comprising cooperating friction elements, loading springs for said elements housed within and extending through said tubular pins, a plurality of actuating plungers, and an annular plate within said drum acted upon by said plungers and acting in turn on said loading springs.

7. In a transmission mechanism, the combination of a driving sleeve gear, a driven sleeve gear, a brakeable pinion-carrying structure cooperating with said gears having two members which are axially shiftable relatively to each other, and a duplex conical friction element carried by the sleeve of one of said gears intermediate of the ends of said sleeve which in the engaged position is clamped between opposing friction surfaces on the respective members of the pinion-carrying structure.

8. In a transmission mechanism, the combination of a driving sleeve gear, a driven sleeve gear, a brakeable pinion-carrying structure having pinions cooperating with said gears and including a pinion cage and a drum axially shiftable with respect to said cage, said pinion cage having an end plate, and a friction clutch for connecting said structure with the first gear having a cone friction ring rigid with said end plate and projecting outwardly therefrom.

9. In a transmission mechanism, the combination of a driving sleeve gear, a driven sleeve gear, a brakeable pinion-carrying structure having pinions cooperating with said gears and including a pinion cage and an axially shiftable drum, said pinion cage having an end plate, and a friction clutch for connecting said structure with one of said gears including a friction element on the sleeve of one of said gears adapted to be clamped between opposing friction surfaces carried by the respective members of the pinion-carrying structure, one of said last-named surfaces being on a cone member projecting from said end plate.

10. In a transmission mechanism, the combination of a driving sleeve gear, a driven sleeve gear, a brakeable pinion-carrying structure having pinions cooperating with said gears and including a pinion cage and an axially shiftable drum, said pinion cage having an end plate, and a friction clutch for connecting said structure with one of said gears including a friction element on the sleeve of one of said gears adapted to be clamped between opposing friction surfaces carried by the respective members of the pinion-carrying structure, one of said last-named surfaces being on a cone member projecting from said end plate, the other of said last-named friction surfaces being provided on an end extension of the drum.

11. In a transmission mechanism, the combination of a housing, a longitudinally disposed shaft within the housing having a forward end portion extended substantially to the forward end portion of the housing, said shaft having a rear portion mounted in the rear portion of the housing, an engine-driven member having a sleeve loosely surrounding said shaft in the forward end portion of the housing, a gear fixed to said shaft intermediate of the ends of the shaft, a gear driven from said sleeve adjacent the rear end of said sleeve, a friction clutch cone driven from said sleeve intermediate the ends of the sleeve, and means within the housing including a pinion cage and a braking drum therefor cooperating with said gears and with said friction clutch member for driving said shaft forwardly or reversely, said cage and drum having friction cones cooperating with said first cone.

JOHN O. BERNDTSON.

REFERENCES CITED

The following references are of record in the file of this patent:

UNITED STATES PATENTS

| Number | Name | Date |
|---|---|---|
| 763,548 | Ferguson | June 28, 1904 |
| 1,169,425 | Perkins | Jan. 25, 1916 |
| 1,248,110 | Heaney | Nov. 27, 1917 |
| 1,282,147 | Trethewey | Oct. 22, 1918 |
| 1,282,563 | Franzen | Oct. 22, 1918 |
| 1,635,063 | Ulrich | July 5, 1927 |
| 1,918,775 | Nabstedt | July 18, 1933 |
| 2,040,287 | Ware | May 12, 1936 |
| 2,228,617 | Ware | Jan. 14, 1941 |
| 2,230,604 | Ware | Feb. 4, 1941 |
| 2,255,243 | Fawick | Sept. 9, 1941 |
| 2,288,206 | Pierpont | June 30, 1942 |